United States Patent
Michaloski et al.

(10) Patent No.: US 8,724,203 B2
(45) Date of Patent: May 13, 2014

(54) VARIABLE PULSE STRETCHING LENGTH BY VARIABLE BEAMSPLITTER REFLECTIVITY

(75) Inventors: Paul Francis Michaloski, Rochester, NY (US); Mark C Sanson, Macedon, NY (US)

(73) Assignee: Corning Incorporated, Corning, NY (US)

( * ) Notice: Subject to any disclaimer, the term of this patent is extended or adjusted under 35 U.S.C. 154(b) by 233 days.

(21) Appl. No.: 13/316,884

(22) Filed: Dec. 12, 2011

(65) Prior Publication Data

US 2013/0148185 A1   Jun. 13, 2013

(51) Int. Cl.
  *G02B 26/00*  (2006.01)
  *G02F 1/01*  (2006.01)
  *H04B 10/54*  (2013.01)

(52) U.S. Cl.
  CPC .................................. *H04B 10/541* (2013.01)
  USPC ....................................................... 359/238

(58) Field of Classification Search
  USPC .................. 359/238, 572; 372/25, 30, 34, 55
  See application file for complete search history.

(56) References Cited

U.S. PATENT DOCUMENTS

| | | | |
|---|---|---|---|
| 6,191,887 B1 | 2/2001 | Michaloski et al. | |
| 6,389,045 B1 | 5/2002 | Mann et al. | |
| 6,535,531 B1 | 3/2003 | Smith et al. | |
| 6,928,093 B2 | 8/2005 | Webb et al. | |
| 7,369,597 B2 | 5/2008 | Smith et al. | |
| 7,403,550 B1 | 7/2008 | Spinelli et al. | |
| 7,620,080 B2 | 11/2009 | Cobb et al. | |
| 7,813,406 B1 | 10/2010 | Nguyen et al. | |
| 2005/0105579 A1 | 5/2005 | Smith et al. | |
| 2005/0259709 A1 | 11/2005 | Das et al. | |
| 2005/0264785 A1* | 12/2005 | Albert ............................ | 355/67 |
| 2006/0126681 A1 | 6/2006 | Botma et al. | |
| 2008/0013163 A1* | 1/2008 | Leonardo et al. ........ | 359/341.31 |
| 2008/0179548 A1 | 7/2008 | Bykanov et al. | |
| 2009/0080478 A1 | 3/2009 | Burkert et al. | |
| 2009/0154642 A1 | 6/2009 | Bykanov et al. | |
| 2010/0127186 A1 | 5/2010 | Bykanov et al. | |
| 2011/0284767 A1* | 11/2011 | Wolleschensky et al. . | 250/459.1 |

FOREIGN PATENT DOCUMENTS

| | | |
|---|---|---|
| CN | 100491048 | 5/2009 |
| DE | 102006004075 | 8/2007 |
| WO | 00/43822 | 7/2000 |

OTHER PUBLICATIONS

Burkett et al; "Pulse Stretcher With Variable Pulse Length for Excimer Laser Applications"; Review of Scientific Instruments, 81, 033104 (2010).

Khare et al; "Temporal Stretching of Laser Pulses"; Coherence and Ultrashort Pulse Laser Emissions, pp. 205-226.

(Continued)

*Primary Examiner* — Mahidere Sahle
(74) *Attorney, Agent, or Firm* — Timothy M Schaeberle

(57) ABSTRACT

A laser pulse stretching unit is described herein which is configured to change the reflectivity of one or more beam splitters located therein to change a temporal profile of an output beam without needing to adjust a length of any delay lines. In addition, a method is described herein for using the laser pulse stretching unit to change the reflectivity of one or more beam splitters located therein to change a temporal profile of an output beam without needing to adjust a length of any delay lines.

18 Claims, 13 Drawing Sheets

(56) References Cited

OTHER PUBLICATIONS

Kojima et al; "Laser Pulse-Strecthing With Multiple Optical Ring Cavities"; Applied Optics; vol. 41, No. 30; October 20, 2002; pp. 6360-6370.

Machine translation CN100491048.
Machine translation DE102006004075.
PCT/US2012/068657 Search Report.

* cited by examiner

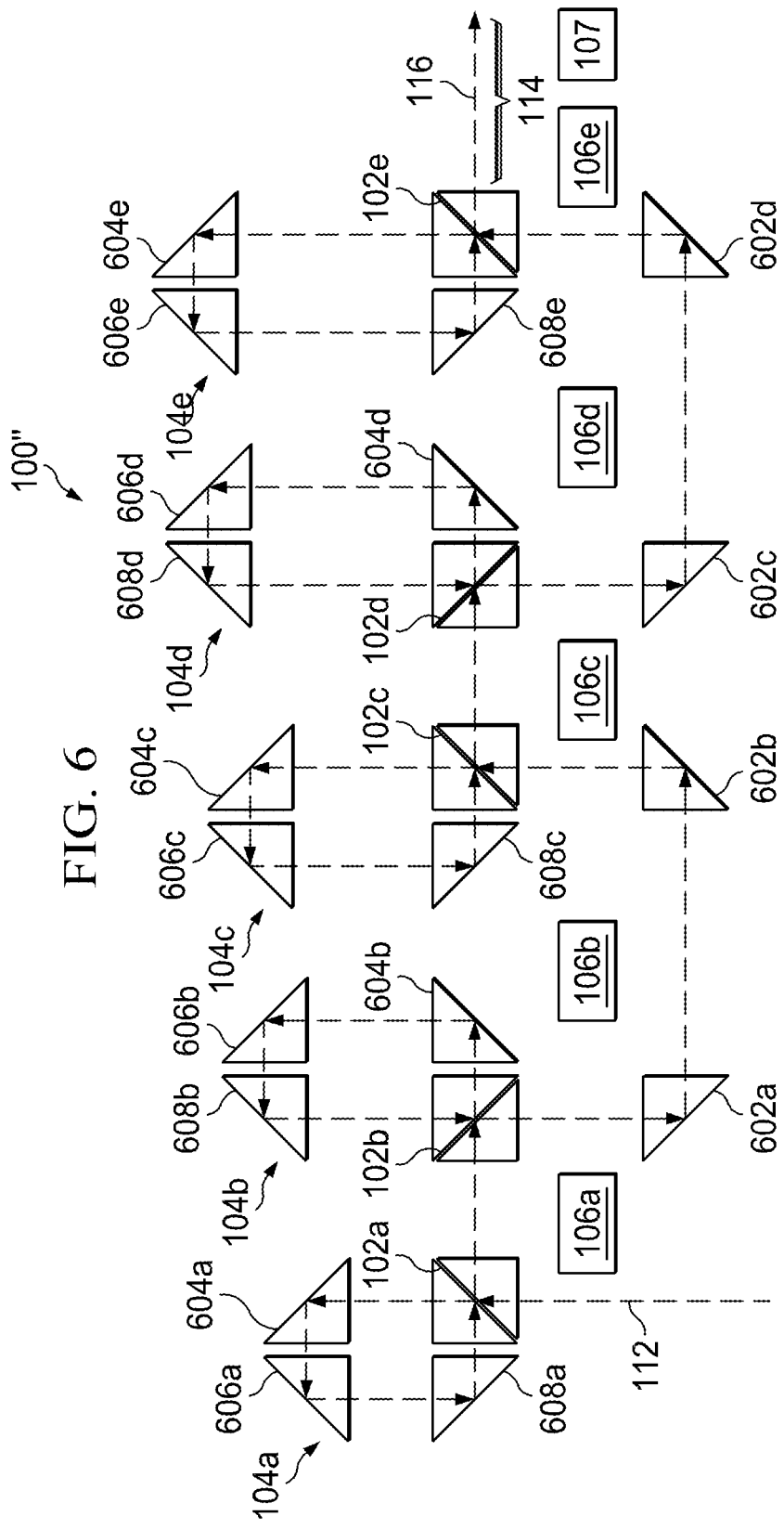

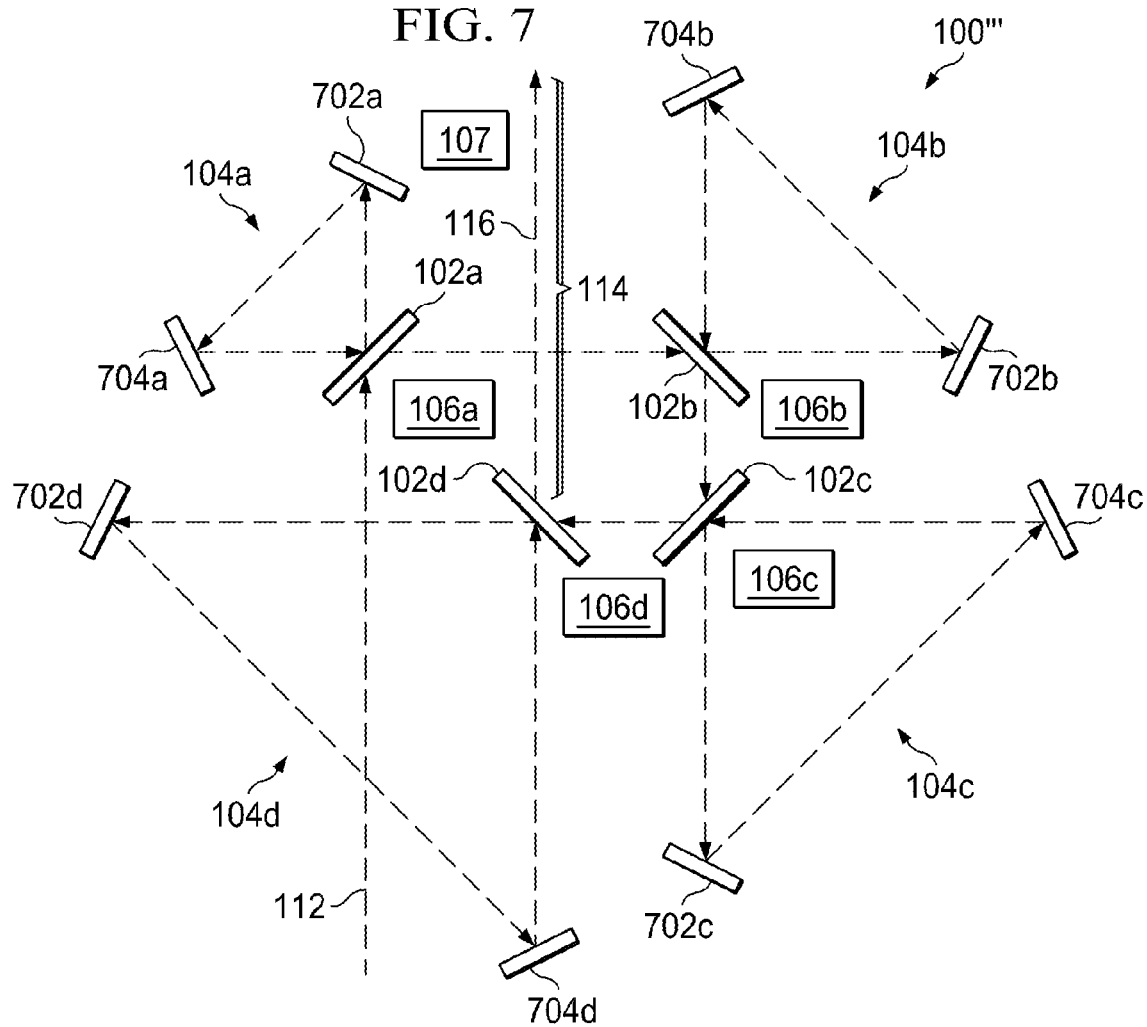

VARIABLE PULSE STRETCHING LENGTH BY VARIABLE BEAMSPLITTER REFLECTIVITY

TECHNICAL FIELD

The present invention relates to a laser pulse stretching unit which is configured to change the reflectivity of one or more beam splitters located therein in order to change a temporal profile of an output beam without needing to adjust a length of any delay lines. The present invention also relates to a method for using the laser pulse stretching unit.

BACKGROUND

Many lasers operate as pulsed sources and the pulse duration is determined by the duration of effective pumping, intra-resonator energy extraction rates, etc. However, in certain applications which utilize the pulsed lasers it is advantageous to extend the duration of the pulsed laser beam without reducing the pulse energy. The duration of the pulsed laser beam can be increased by using a laser pulse stretcher which stretches the laser pulses temporally. The stretching or lengthening of the temporal pulse width of the laser beam is done for a wide-variety of reasons and applications. For example, the stretching or lengthening of the temporal pulse width of the laser beam can be done to reduce speckle, reduce the damage on optical components by lowering the peak intensity and lengthening the duration of a single laser pulse that interacts with the optical components, or to optimize the pulse length of the laser pulse for the work on materials which are being irradiated for transformation such as crystallization by sequential layer process or laser ablation.

The traditional laser pulse stretching unit has one or more delay lines which are used to take a single input beam and create multiple beams which are delayed with respect to one another to generate an output beam which is the summation of all of the beams. However, the traditional laser pulse stretching unit can be difficult to reconfigure to change the temporal profile of the output beam for use in another application or to optimize the temporal profile of the output beam for use in the current application. For example, the traditional laser pulse stretching unit may have delay line(s) with refocusing optics that keep the beam from diverging when traveling around the loop(s) of the delay line(s) and these refocusing optics are set for the given length(s) of the delay line(s). Hence, if one wanted to reconfigure this traditional laser pulse stretching unit, then they would have to replace the refocusing optics and this replacement would also require the re-alignment and mechanical changes to the mounting of the delayed line's optics. Accordingly, there is a need to address this shortcoming and other shortcomings associated with the traditional laser pulse stretching units. This need and other needs are satisfied by the present invention.

SUMMARY

A laser light pulse stretching unit and a method for using the laser light pulse stretching unit are described in the independent claims of the present application. Advantageous embodiments of the laser light pulse stretching unit and the method for using the laser light pulse stretching unit are described in the dependent claims.

In one aspect, the present invention provides a laser light pulse stretching unit which comprises a first beam splitter, a first delay line, and a reconfiguration device. The first beam splitter is configured to receive an input light beam and direct a portion of the input light beam along an output path and to direct a remaining portion of the input light beam onto a first delayed path created by the first delay line. In addition, the first beam splitter is configured to receive the remaining portion of the input light beam that traversed the first delayed path and direct a portion of the input light beam that traversed the first delayed path onto the output path and direct a remaining portion of the input light beam that traversed the first delayed path back onto the first delayed path. Plus, the first beam splitter is configured to continually direct a portion of the remaining portion of the input light beam which traversed the first delayed path back onto the first delayed path and a remaining portion of the remaining portion of the input light beam which traversed the first delayed path onto the output path, where the remaining portions of the input light beam that are on the output path collectively form an output beam which has a specific temporal profile. The reconfiguration device is configured to interact with the first beam splitter to change the specific temporal profile of the output beam. In one example, the reconfiguration device is configured to change the specific temporal profile of the output beam by replacing the first beam splitter which has a first reflectivity with another beam splitter which has another reflectivity. In another example, the reconfiguration device is configured to change the specific temporal profile of the output beam by repositioning the first beam splitter which has a multi-reflective coating thereon such that the first beam splitter which had a first reflectivity when originally positioned to receive the input light beam would have a second reflectivity after being repositioned to receive the input light beam.

In another aspect, the present invention provides a method for using a light pulse stretching unit. The method comprising a step of receiving an input light beam at the laser light pulse stretching unit which includes a first beam splitter, a first delay line, and a reconfiguration device. The first beam splitter is configured to receive an input light beam and direct a portion of the input light beam along an output path and to direct a remaining portion of the input light beam onto a first delayed path created by the first delay line. In addition, the first beam splitter is configured to receive the remaining portion of the input light beam that traversed the first delayed path and direct a portion of the input light beam that traversed the first delayed path onto the output path and direct a remaining portion of the input light beam that traversed the first delayed path back onto the first delayed path. Plus, the first beam splitter is configured to continually direct a portion of the remaining portion of the input light beam which traversed the first delayed path back onto the first delayed path and a remaining portion of the remaining portion of the input light beam which traversed the first delayed path onto the output path, where the remaining portions of the input light beam that are on the output path collectively form an output beam which has a specific temporal profile. The method further comprises a step of interacting with the first beam splitter to change the specific temporal profile of the output beam without adjusting a length of the first delayed path created by the first delay line. In one example, the interacting step can be performed by a reconfiguration device configured to change the specific temporal profile of the output beam by replacing the first beam splitter which has a first reflectivity with another beam splitter which has another reflectivity. In another example, the interacting step can be performed by a reconfiguration device configured to change the specific temporal profile of the output beam by repositioning the first beam splitter which has a multi-reflective coating thereon such that the first beam splitter which had a first reflectivity when originally positioned to receive the input light beam would have a second reflectivity after being repositioned to receive the input light beam.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein:

FIG. 6 is a block diagram of yet another exemplary light pulse stretching unit configured in accordance with an embodiment of the present invention;

FIG. 7 is a block diagram of still yet another exemplary light pulse stretching unit configured in accordance with an embodiment of the present invention;

DETAILED DESCRIPTION

Figure 1:
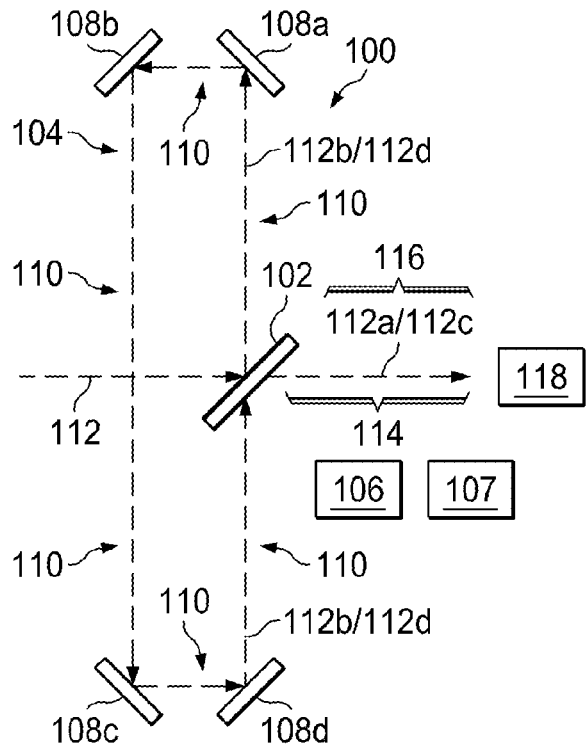
FIG. 1 is a block diagram of an exemplary light pulse stretching unit configured in accordance with an embodiment of the present invention.

Referring to FIG. 1, there is illustrated a block diagram of an exemplary light pulse stretching unit 100 configured in accordance with an embodiment of the present invention. The exemplary light pulse stretching unit 100 includes a first beam splitter 102, a first delay line 104, a reconfiguration device 106, and an optional feedback unit 107. The exemplary light pulse stretching unit 100 may include other components such as a mechanical housing and various mechanical components which respectively house and support the beam splitter 102, the first delay line 104 and the reconfiguration device 106 but for clarity many of these components are not discussed herein while the components 102, 104, 106 and 107 which are relevant to the present invention are described in detail hereinafter.

In this example, the first delay line 104 has four mirrors 108a, 108b, 108c and 108d which are positioned to create the first delayed path 110 on which a light beam which is received from the first beam splitter 102 can travel and then be returned to the beam splitter 102. These mirrors 108a, 108b, 108c and 108d might be plano or could have optical power to focus the beam along the beam delay back to the beam splitter 102 which reduces the divergence of the beam in the longer propagation distance. However, the first delay line 104 can be configured to have two or more mirrors (or prisms, optical routers, waveguides) and possibly some refocusing optics which are positioned to create a first delayed path 110 on which a light beam which is received from the first beam splitter 102 can travel and then be returned to the first beam splitter 102 (e.g., see FIGS. 6-7). In any case, the first beam splitter 102 is configured to receive an input light beam 112 and direct a portion of the input light beam 112a along an output path 114 and to direct a remaining portion of the input light beam 112b onto the first delayed path 112 created by the first delay line 104. The first beam splitter 102 is also configured to receive the remaining portion of the input light beam 112b that traversed the first delayed path 110 and direct a portion of the input light beam 112c that traversed the first delayed path 110 onto the output path 114 and direct a remaining portion of the input light beam 112d that traversed the first delayed path 110 path back onto the first delayed path 110. In fact, the first beam splitter 102 will continually direct a portion of the incident light beam 112 which traversed the first delayed path 110 back onto the first delayed path 110 and direct another portion of the incident light beam 112 onto the output path 114 and each time this occurs less energy from the incident light beam 112 will be directed to the first delayed path 110 and the output path 114. The remaining portions of the input light beam 112a, 112c etc. ... that are directed to the output path 114 collectively form an output beam 116 which has a specific temporal profile.

The reconfiguration device 106 is configured to interact with the first beam splitter 102 to change the specific temporal profile of the output beam 116 without adjusting a length of the first delayed path 110 created by the first delay line 104. In particular, the reconfiguration device 106 is configured to change the reflectivity of the first beam splitter 102 to change a temporal profile of the output beam 116. For example, one may want to change the specific temporal profile of the output beam 116 if the output beam 116 is to interact with a new work product 118 in a different application or if the output beam 116 is to be optimized to work on the same work product 118 in the same application. In addition, the feedback unit 107 can be used to determine if and in what manner the first beam splitter 102 needs to be changed to obtain the desirable output beam 116. For instance, the feedback unit 107 can be configured to monitor an effect the output beam 116 has on the work product 118 and if needed based on the monitored effect instruct the reconfiguration device 106 or the person using the reconfiguration device 106 how the first beam splitter 102 needs to be changed to obtain the desirable output beam 116. In addition, the feedback unit 107 can be configured to compute based on parameters of a process in which the output beam 116 is to be used how the first beam splitter 102 needs to be changed to obtain the desirable output beam 116. A detailed discussion about three different reconfiguration devices 106', 106" and 106''' is provided next with respect to FIGS. 2-4.

Figure 2:
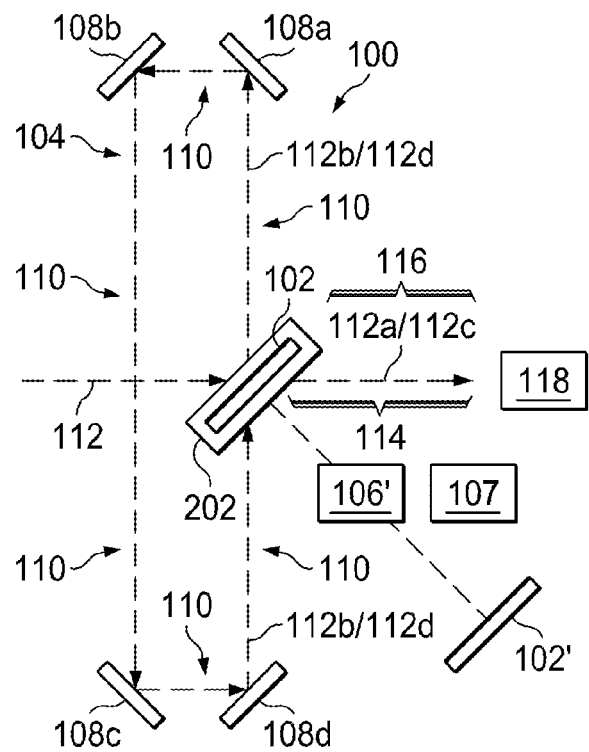
FIG. 2 is a block diagram of the exemplary light pulse stretching unit shown in FIG. 1 configured to incorporate one type of reconfiguration device in accordance with an embodiment of the present invention.

Referring to FIG. 2, there is illustrated a block diagram of the exemplary light pulse stretching unit 100 configured to incorporate one type of reconfiguration device 106' in accordance with an embodiment of the present invention. As shown, the exemplary light pulse stretching unit 100 includes the first beam splitter 102, the first delay line 104, the reconfiguration device 106', and the optional feedback unit 107. In this example, the reconfiguration device 106' is configured to change the specific temporal profile of the output beam 116 by replacing the first beam splitter 102 which has a first reflectivity with a replacement beam splitter 102' which has another reflectivity. The reconfiguration device 106' can be any mechanical device that can be used to grip the first beam splitter 102 and remove it from its support 202 and grip the replacement beam splitter 102' and insert it into the support 202. For example, the mechanical device could be of a kinematic design such that the tilt and position of the first and replacement beam splitter are maintained and realignment can be avoided. The reconfiguration device 106' may also be configured to tip or tilt the replacement beam splitter 102' if needed to properly align the replacement beam splitter 102' with the first delay line 104. The reconfiguration device 106' by replacing the first beam splitter 102 which has a first reflectivity with the replacement beam splitter 102' which has a different reflectivity is a quick and rather inexpensive way to change the temporal profile of the output beam 116 without having to adjust the path length of the first delay line 104. If desired, the feedback unit 107 can be used to determine the specific reflectivity of the replacement beam splitter 102' which needs to be used to obtain the desirable output beam 116. For instance, the feedback unit 107 can be configured to monitor an effect the output beam 116 has on the work product 118 and if needed based on the monitored effect determine the specific reflectivity of the replacement beam splitter 102' which needs to be used to obtain the desirable output beam 116. In addition, the feedback unit 107 can be configured to compute the specific reflectivity of the replacement beam splitter 102' which needs to be used to obtain the desirable output beam 116 based on parameters of a process in which the output beam 116 is to be used.

Figure 3:
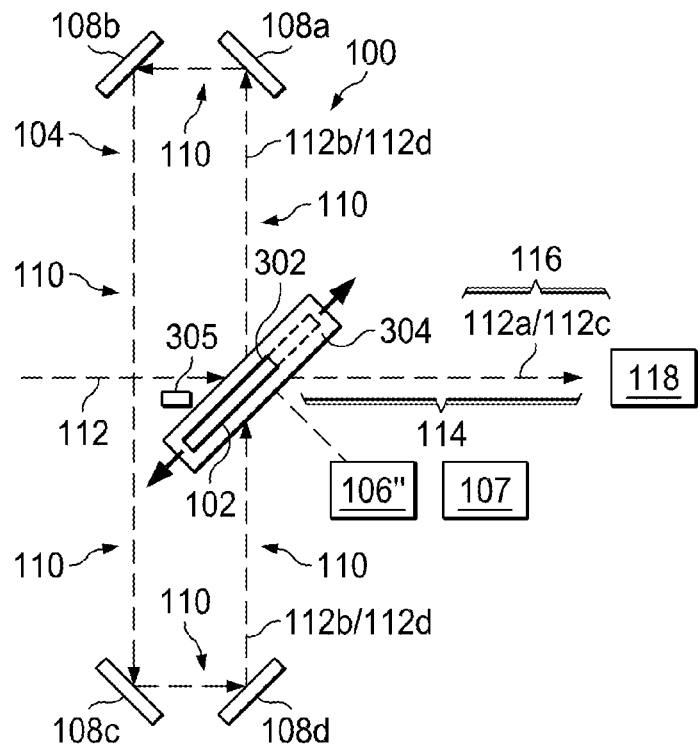
FIG. 3 is a block diagram of the exemplary light pulse stretching unit shown in FIG. 1 configured to incorporate another type of reconfiguration device in accordance with an embodiment of the present invention.

Referring to FIG. 3, there is illustrated a block diagram of the exemplary light pulse stretching unit 100 configured to incorporate another type of reconfiguration device 106" in accordance with an embodiment of the present invention. As shown, the exemplary light pulse stretching unit 100 includes the first beam splitter 102, the first delay line 104, the reconfiguration device 106", and the optional feedback unit 107. In this example, the reconfiguration device 106" is configured to change the specific temporal profile of the output beam 116 by repositioning the first beam splitter 102 which has a multi-reflective coating 302 thereon such that the first beam splitter 102 which had a first reflectivity when originally positioned to receive the input light beam 112 would now have a second reflectivity after being repositioned to receive the input light beam 112. The multi-reflective coating 302 can be either a variable reflective coating with a continuous change of reflectivities (e.g., 0.3-0.6 reflectivity) or a discrete reflective coating with separate discrete reflectivities (e.g., 0.3, 0.4, 0.5 and 0.6 reflectivity). The reconfiguration device 106" includes a slide 304 on which the first beam splitter 102 is positioned and an actuator 305 that moves the slide 304 and the attached first beam splitter 102 from one position to another position to change the specific temporal profile of the output beam 116. If desired, the feedback unit 107 can be used to determine the specific reflectivity on the first beam splitter 102 which needs to be used to obtain the desirable output beam 116. For instance, the feedback unit 107 can be configured to monitor an effect the output beam 116 has on the work product 118 and if needed based on the monitored effect determine the specific reflectivity of the first beam splitter 102 which needs to be used to obtain the desirable output beam 116. In addition, the feedback unit 107 can be configured to compute based on parameters of a process in which the output beam 116 is to be used the specific reflectivity of the first beam splitter 102 which is needed to obtain the desirable output beam 116. The feedback unit 107 may instruct the reconfiguration device 106" on how much the first beam splitter 102 needs to be moved so the reconfiguration device 106" can automatically position the first beam splitter 102 such that the desired reflectivity in the multi-reflective coating 302 is correctly positioned to receive the input light beam 112 and the light beams 112b, 112d . . . that traversed the delayed path 110.

Figure 4:
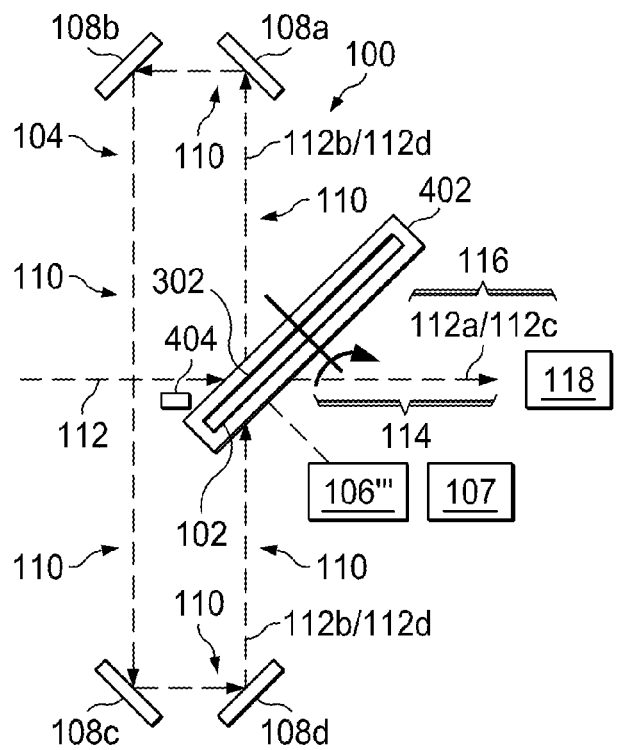
FIG. 4 is a block diagram of the exemplary light pulse stretching unit shown in FIG. 1 configured to incorporate another type of reconfiguration device in accordance with an embodiment of the present invention.

Referring to FIG. 4, there is illustrated a block diagram of the exemplary light pulse stretching unit 100 configured to incorporate another type of reconfiguration device 106''' in accordance with an embodiment of the present invention. As shown, the exemplary light pulse stretching unit 100 includes the first beam splitter 102, the first delay line 104, the reconfiguration device 106''', and the optional feedback unit 107. In this example, the reconfiguration device 106''' is configured to change the specific temporal profile of the output beam 116 by repositioning the first beam splitter 102 which has a multi-reflective coating 302 thereon such that the first beam splitter 102 which had a first reflectivity when originally positioned to receive the input light beam 112 would now have a second reflectivity after being repositioned to receive the input light beam 112. The multi-reflective coating 302 can be either a variable reflective coating with a continuous change of reflectivities (e.g., 0.3-0.6 reflectivity) or a discrete reflective coating with separate discrete reflectivities (e.g., 0.3, 0.4, 0.5 and 0.6 reflectivity). The reconfiguration device 106''' includes a wheel 402 on which the first beam splitter 102 is positioned and an actuator 404 that rotates the wheel 402 and the attached first beam splitter 102 from one position to another position to change the specific temporal profile of the output beam 116. If desired, the feedback unit 107 can be used to determine the specific reflectivity on the first beam splitter 102 which needs to be used to obtain the desirable output beam 116. For instance, the feedback unit 107 can be configured to monitor an effect the output beam 116 has on the work product 118 and if needed based on the monitored effect determine the specific reflectivity of the first beam splitter 102 which needs to be used to obtain the desirable output beam 116. In addition, the feedback unit 107 can be configured to compute based on parameters of a process in which the output beam 116 is to be used the specific reflectivity of the first beam splitter 102 which is needed to obtain the desirable output beam 116. The feedback unit 107 may instruct the reconfiguration device 106''' on how much the first beam splitter 102 needs to be moved so the reconfiguration device 106''' can automatically position the first beam splitter 102 such that desired reflectivity in the multi-reflective coating 302 is correctly positioned to receive the input light beam 112 and the light beams 112b, 112d . . . that traversed the delayed path 110.

Figure 5:
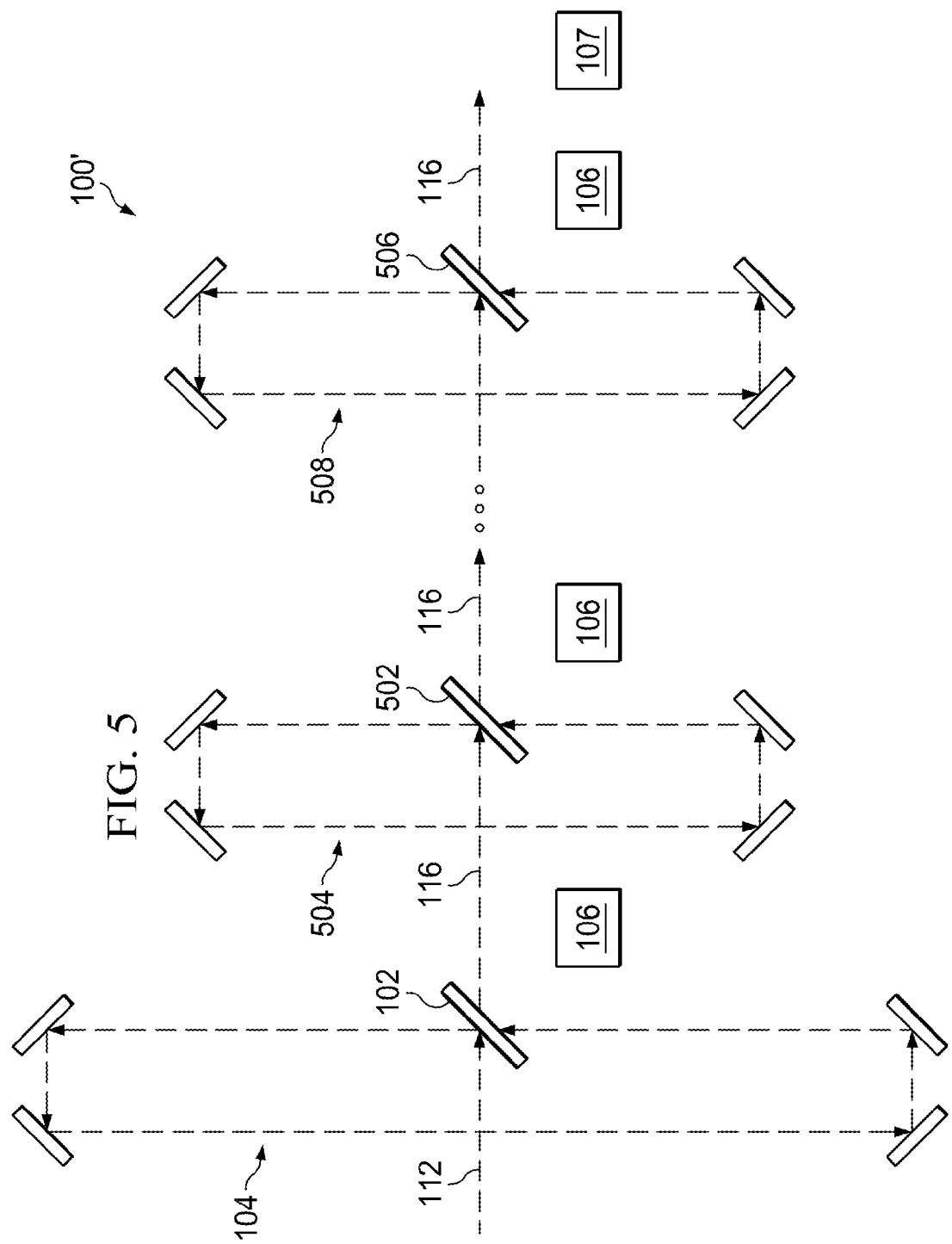
FIG. 5 is a block diagram of another exemplary light pulse stretching unit configured in accordance with an embodiment of the present invention.

Referring to FIG. 5, there is illustrated a block diagram of an exemplary light pulse stretching unit 100' configured in accordance with an embodiment of the present invention. The exemplary light pulse stretching unit 100' includes a first beam splitter 102, a first delay line 104, a second beam splitter 502, a second delay line 504, one or more additional beam splitters 506 (optional), one or more additional delay lines 508 (optional), one or more reconfiguration devices 106, and an optional feedback unit 107. In this example, the light pulse stretching unit 100' includes multiple sets of beam splitters and delay lines 102/104, 502/504 and 506/508 which are connected in series. The multiple sets of beam splitters and delay lines 102/104, 502/504 and 506/508 are connected to one another in series such that the first beam splitter 102 and first delay line 104 receive the input beam 112 and output the output beam 116 which is the input to the second beam splitter 502 and second delay line 504 and their output beam 116 is the input to the next beam splitter and delay line and so on. The reconfiguration device(s) 106 can interact with any one or any combination of the beam splitters 102, 502, and 506 to change the specific temporal profile of the final output beam 116 without adjusting a length of any of the delayed paths created by the delay lines 104, 504 and 508. The reconfiguration device(s) 106 can include any one or any combination of the aforementioned reconfiguration devices 106', 106" and 106'''. The beam splitters 104, 502 and/or 506 can have the same or different multi-reflective coatings 302 thereon which can be either a variable reflective coating with a continuous change of reflectivities (e.g., 0.3-0.6 reflectivity) or a discrete reflective coating with separate discrete reflectivities (e.g., 0.3, 0.4, 0.5 and 0.6 reflectivity). In addition, the beam splitters 104, 504 and/or 506 can have a fixed reflectivity in which case the reconfiguration device 106' would be used to replace any one or combination of these type of beam splitters 104, 504 and 506 with one or more replacement beam splitters that have different reflectivities to obtain the desired temporal profile of the output beam 116. If desired, the feedback unit 107 can be used to determine if and in what manner which one or combination of beam splitters 104, 502 and 506 needs to be changed to obtain the desirable final output beam 116. The light pulse stretching unit 100' has multiple sets of beam splitters and delay lines 102/104, 502/504 and 506/508 which can have many different configurations and many different types and lengths of delay lines.

Referring to FIG. 6, there is illustrated a block diagram of an exemplary light pulse stretching unit 100" configured in accordance with an embodiment of the present invention. The exemplary light pulse stretching unit 100" includes five beam splitters 102a, 102b . . . 102e, five delay lines 104a, 104b . . . 104e, five reconfiguration devices 106a, 106b . . . 106e, four beam redirectors 602a, 602b, 602c and 602d, and an optional feedback unit 107. As shown, the light pulse stretching unit 100" receives the input light beam 112 at the first beam splitter 102a which reflects a portion of the input light beam 112 to the second beam splitter 102b and transmits a remaining portion of the input light beam 112 into the first delay line 104a. In this example, the first delay line 104a includes three prisms 604a, 606a and 608a through which the remaining portion of the input light beam 112 travels before reaching the first beam splitter 102a. The first beam splitter 102a then transmits a portion of the input light beam 112 that traversed the first delay line 104a towards the second beam splitter 102b and reflects the remaining portion of the received input light beam 112 back into the first delay line 104a.

The second beam splitter 102b receives the different portions of the input light beam 112 and reflects a portion of the received input light beam 112 to the first beam redirector 602a and transmits a remaining portion of the received input light beam 112 into the second delay line 104b. In this example, the second delay line 104b includes three prisms 604b, 606b and 608b through which the remaining portion of the received input light beam 112 travel before reaching the second beam splitter 102b. The second beam splitter 102b then transmits a portion of the input light beam 112 that traversed the second delay line 104b towards the first beam redirector 602a and reflects the remaining portion of the received input light beam 112 back into the second delay line 104b.

The first beam redirector 602a receives the different portions of the input light beam 112 and reflects the different portions of the input light beam 112 to the second beam redirector 602b. The second beam redirector 602b reflects the received portions of the input light beam 112 to the third beam splitter 102c. The third beam splitter 102c receives the different portions of the input light beam 112 and reflects a portion of the received input light beam 112 to the fourth beam splitter 102d and transmits a remaining portion of the received input light beam 112 into the third delay line 104c. In this example, the third delay line 104c includes three prisms 604c, 606c and 608c through which the remaining portion of the received input light beam 112 travels before reaching the third beam splitter 102c. The third beam splitter 102c then transmits a portion of the input light beam 112 that traversed the third delay line 104c towards the fourth beam splitter 102d and reflects the remaining portion of the received input light beam 112 back into the third delay line 104c.

The fourth beam splitter 102d receives the different portions of the input light beam 112 and reflects a portion of the received input light beam 112 to the third beam redirector 602c and transmits a remaining portion of the received input light beam 112 into the fourth delay line 104d. In this example, the fourth delay line 104d includes three prisms 604d, 606d and 608d through which the remaining portion of the received input light beam 112 travels before reaching the fourth beam splitter 102d. The fourth beam splitter 102d then transmits a portion of the input light beam 112 that traversed the fourth delay line 104d towards the third beam redirector 602c and reflects the remaining portion of the received input light beam 112 back into the fourth delay line 104d.

The third beam redirector 602c receives the different portions of the input light beam 112 and reflects the different portions of the input light beam 112 to the fourth beam redirector 602d. The fourth beam redirector 602d reflects the received portions of the input light beam 112 to the fifth beam splitter 102e. The fifth beam splitter 102e receives the different portions of the input light beam 112 and reflects a portion of the received input light beam 112 on an output path 114 and transmits a remaining portion of the received input light beam 112 into the fifth delay line 104e. In this example, the fifth delay line 104e includes three prisms 604e, 606e and 608e through which the remaining portion of the received input light beam 112 travels before reaching the fifth beam splitter 102e. The fifth beam splitter 102e then transmits a portion of the input light beam 112 that traversed the fifth delay line 104e on the output path 114 and reflects the remaining portion of the received input light beam 112 back into the fifth delay line 104e. The remaining portions of the input light beam 112 that are directed to the output path 114 collectively form an output beam 116 which has a specific temporal profile.

The reconfiguration devices 106a, 106b, 106c, 106d, and 106e can interact with any one or any combination of the beam splitters 102a, 102b, 102c, 102d and 102e to change the specific temporal profile of the output beam 116 without adjusting a length of any of the delayed paths created by the delay lines 104a, 104b, 104c, 104d and 104e. The reconfiguration devices 106a, 106b, 106c, 106d, and 106e can include any one or any combination of the aforementioned reconfiguration devices 106', 106" and 106'''. The beam splitters 104a, 104b, 104c, 104d and/or 104e can have the same or different multi-reflective coatings 302 thereon which can be either a variable reflective coating with a continuous change of reflectivities (e.g., 0.3-0.6 reflectivity) or a discrete reflective coating with separate discrete reflectivities (e.g., 0.3, 0.4, 0.5 and 0.6 reflectivity). In addition, the beam splitters 104a, 104b, 104c, 104d and/or 104e can have a fixed reflectivity in which case the reconfiguration device 106' would be used to replace any one or combination of these type of beam splitters 104a, 104b, 104c, 104d and/or 104e with one or more replacement beam splitters that have different reflectivities to change the specific temporal profile of the output beam 116. If desired, the feedback unit 107 can be used to determine if and in what manner which one or any combination of beam splitters 104a, 104b, 104c, 104d and 104e needs to be changed to obtain the desirable final output beam 116.

Referring to FIG. 7, there is illustrated a block diagram of an exemplary light pulse stretching unit 100''' configured in accordance with an embodiment of the present invention. The exemplary light pulse stretching unit 100''' includes four beam splitters 102a, 102b, 102c and 102d, four delay lines 104a, 104b, 104c and 104d, four reconfiguration devices 106a, 106b, 106c and 106d, and an optional feedback unit 107. As shown, the light pulse stretching unit 100''' receives the input light beam 112 at the first beam splitter 102a which reflects a portion of the input light beam 112 to the second beam splitter 102b and transmits a remaining portion of the input light beam 112 into the first delay line 104a. In this example, the first delay line 104a includes two mirrors 702a and 704a through which the remaining portion of the input light beam 112 travels before reaching the first beam splitter 102a. The first beam splitter 102a then transmits a portion of the input light beam 112 that traversed the first delay line 104a towards the second beam splitter 102b and reflects the remaining portion of the input light beam 112 back into the first delay line 104a.

The second beam splitter 102b receives the different portions of the input light beam 112 and reflects a portion of the received input light beam 112 to the third beam splitter 102c and transmits a remaining portion of the received input light beam 112 into the second delay line 104b. In this example, the second delay line 104b includes two mirrors 702b and 704b through which the remaining portion of the received input light beam 112 travels before reaching the second beam splitter 102b. The second beam splitter 102b then transmits a portion of the input light beam 112 that traversed the second delay line 104b towards the third beam splitter 102c and reflects the remaining portion of the input light beam 112 back into the second delay line 104b.

The third beam splitter 102c receives the different portions of the input light beam 112 and reflects a portion of the received input light beam 112 to the fourth beam splitter 102d and transmits a remaining portion of the received input light beam 112 into the third delay line 104c. In this example, the third delay line 104c includes two mirrors 702c and 704c through which the remaining portion of the received input light beam 112 travels before reaching the third beam splitter 102c. The third beam splitter 102c then transmits a portion of the input light beam 112 that traversed the third delay line 104c towards the fourth beam splitter 102d and reflects the remaining portion of the input light beam 112 back into the third delay line 104c.

The fourth beam splitter 102d receives the different portions of the input light beam 112 and reflects a portion of the received input light beam 112 to the output path 114 and transmits a remaining portion of the received input light beam 112 into the fourth delay line 104d. In this example, the fourth delay line 104d includes two mirrors 702d and 704d through which the remaining portion of the received input light beam 112 travels before reaching the fourth beam splitter 102d. The fourth beam splitter 102d then transmits a portion of the received input light beam 112 to the output path 114 and reflects the remaining portion of the input light beam 112 that traversed the fourth delay line 104a back into the fourth delay line 104d. The remaining portions of the input light beam 112 that are directed to the output path 114 collectively form an output beam 116 which has a specific temporal profile.

The reconfiguration devices 106a, 106b, 106c and 106d can interact with any one or any combination of the beam splitters 102a, 102b, 102c and 102d to change the specific temporal profile of the final output beam 116 without adjusting a length of any of the delayed paths created by the delay lines 104a, 104b, 104c and 104d. The reconfiguration devices 106a, 106b, 106c and 106d can include any one or any combination of the aforementioned reconfiguration devices 106', 106'' and 106'''. The beam splitters 104a, 104b, 104c and/or 104d can have the same or different multi-reflective coatings 302 thereon which can be either a variable reflective coating with a continuous change of reflectivities (e.g., 0.3-0.6 reflectivity) or a discrete reflective coating with separate discrete reflectivities (e.g., 0.3, 0.4, 0.5 and 0.6 reflectivity). In addition, the beam splitters 104a, 104b, 104c and/or 104d can have a fixed reflectivity in which case the reconfiguration device 106' would be used to replace any one or combination of these type of beam splitters 104a, 104b, 104c and/or 104d with one or more replacement beam splitters that have different reflectivities to change the specific temporal profile of the output beam 116. If desired, the feedback unit 107 can be used to determine if and in what manner which one or combination of beam splitters 104a, 104b, 104c, and 104d need to be changed to obtain the desirable final output beam 116.

Figure 8A:
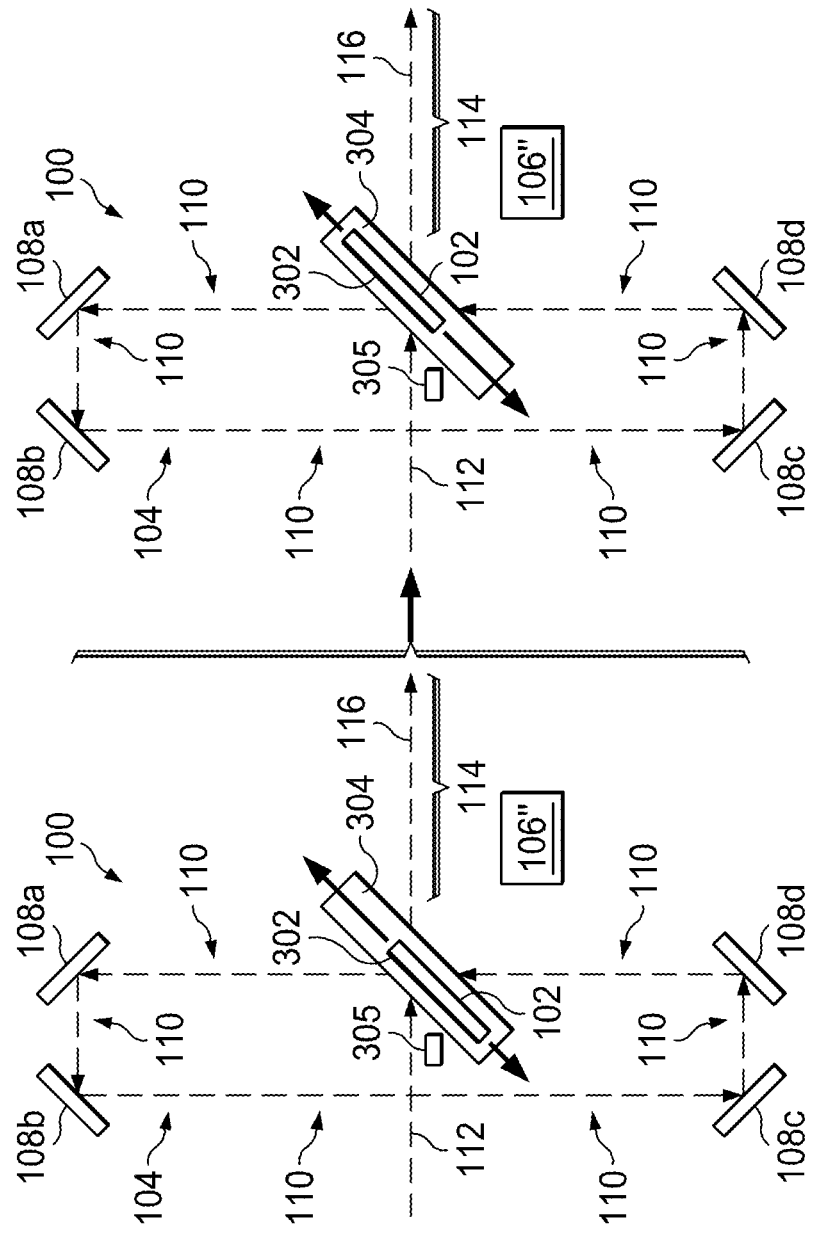
FIGS. 8A-8E are several diagrams, graphs and plots used to explain the features of an exemplary light pulse stretching unit which includes one beam splitter, a reconfiguration device and one delay line in accordance with an embodiment of the present invention.

Referring to FIGS. 8A-8E, there are illustrated several diagrams, graphs and plots used to explain the features of the exemplary light pulse stretching unit 100 which is configured to have one beam splitter 102 (with a multi-reflective coating 302), the reconfiguration device 106'' (with slide 304 and actuator 305) and one delay line 104 (with four mirrors 108a, 108b, 108c and 108d positioned to create the delayed path 110 of 15 ns). As shown in FIG. 8A, the light pulse stretching unit 100 was configured where the beam splitter 102 was positioned to have a 0.6 reflectivity (specific location on the multi-reflective coating 302) when received the input light beam 112 and then the beam splitter 102 was moved to have a 0.1 reflectivity (another specific location on the multi-reflective coating 302) when received the input light beam 112. It should be noted that the beam splitter 102 with a 0.6 reflectivity means that 60% of light that is received is reflected onto the one delay line 104 while 40% of light that is received is passed to the output path 114. And, when first beam splitter 102 has a 0.1 reflectivity means that 10% of light that is received is reflected onto the one delay line 104 while 90% of light that is received is passed to the output path 114. The details of the temporal profile of the input light beam 112 and the temporal profiles of the resulting output beam 116 when the beam splitter 102 had a 0.6 reflectivity and when the beam splitter 102 had a 0.1 reflectivity are described next.

Figure 8B:
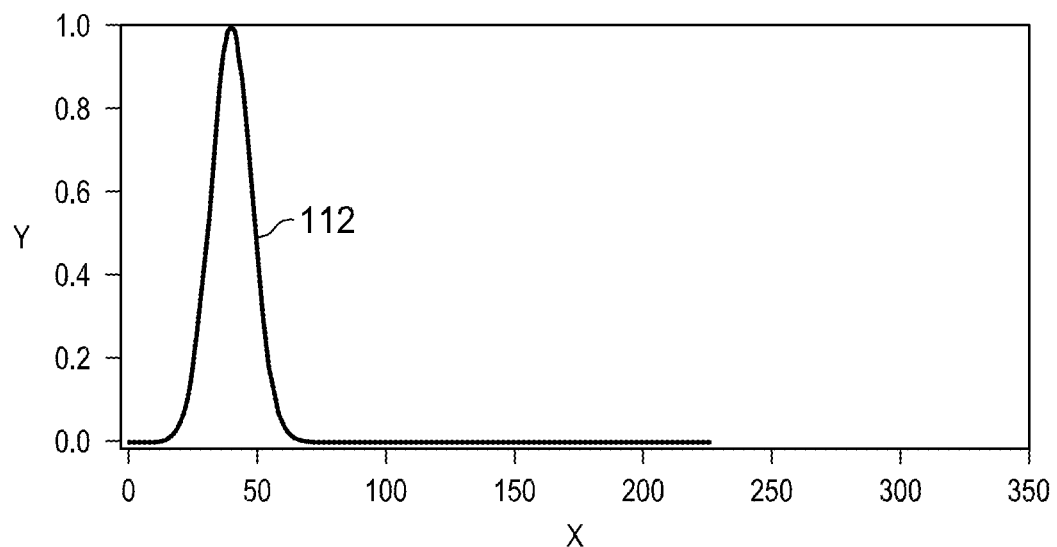

Referring to FIG. 8B, there is a graph illustrating the input light beam 112 which has a normal distribution and a mean=40 ns and a variance=64 $ns^2$ where the x-axis represents delay (ns) and the y-axis represents intensity.

Figure 8C:
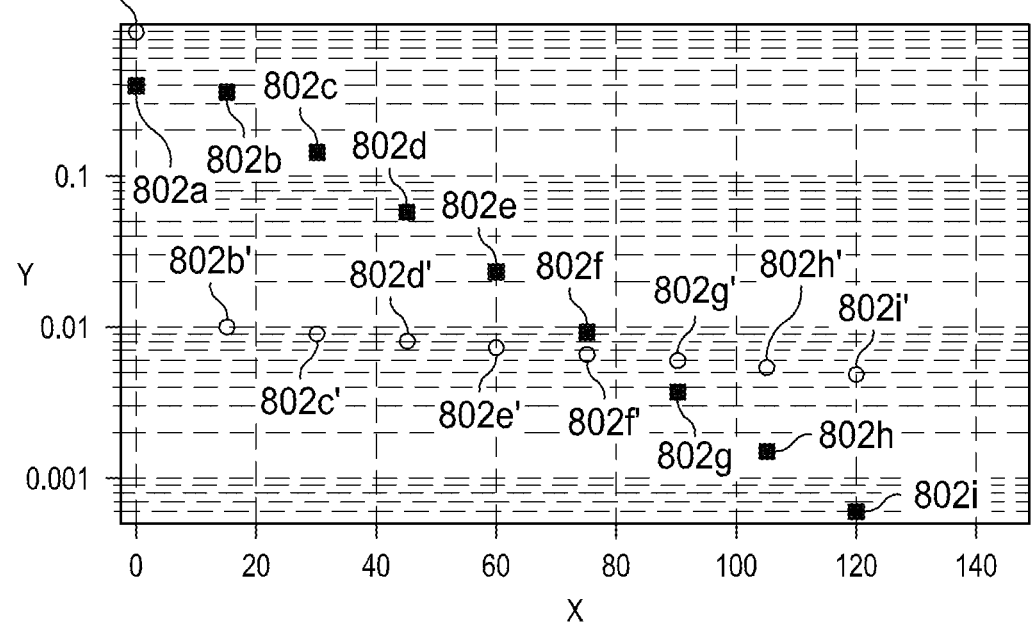

Referring to FIG. 8C, there is a graph illustrating the beamlet delay (ns) (x-axis) relative to beamlet transmission (y-axis) associated with the output beam 116 which is the summation of the beamlets 802a, 802b . . . 802i when the beam splitter 102 had a 0.6 reflectivity and the summation of the beamlets 802a', 802b' . . . 802i' when the beam splitter 102 had a 0.1 reflectivity. The term beamlet here refers to a beam that is created every time an existing beam passes through the beam splitter 102. The first beamlets 802a and 802a' represent the portion of the input light 112 that passed through the beam splitter 102 without traversing the delayed path 110. The second beamlets 802b and 802b' represent the portion of the input light 112 that passed through the beam splitter 102 after one time of traversing the delayed path 110. The third beamlets 802c and 802c' represent the portion of the input light 112 that passed through the beam splitter 102 after two times of traversing the delayed path 110. And so on, where the eighth beamlet 802i and 802i' represents the portion of the input light 112 that passed through the beam splitter 102 after seven times of traversing the delayed path 110. In fact, the beam splitter 102 will continually direct a portion of the incident light beam 112 which traversed the first delayed path 110 back onto the first delayed path 110 and another portion of the incident light beam 112 onto the output path 114 and each time this occurs less energy from the incident light beam 112 will be directed to the output path 114 and the first delayed path 110.

Figure 8D:
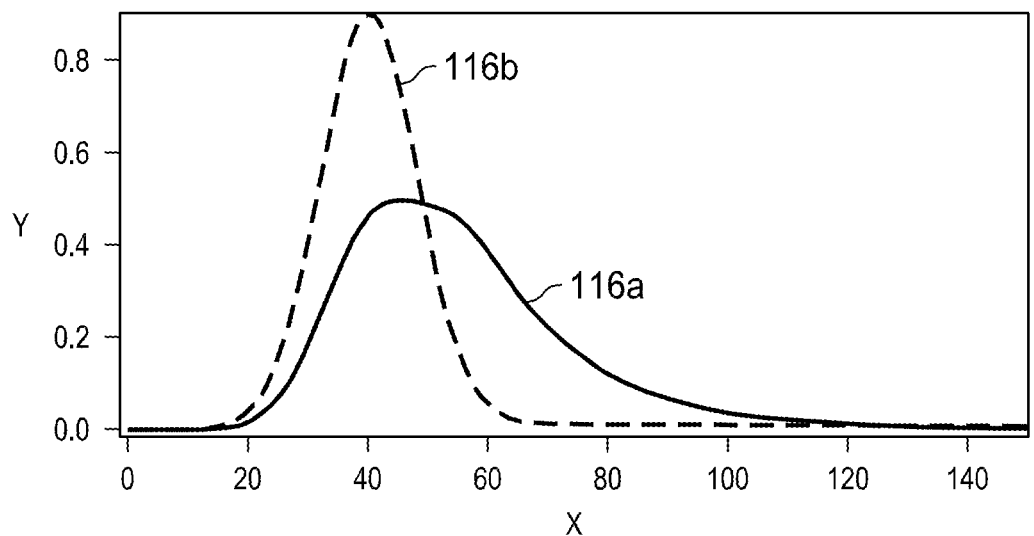

Referring to FIG. 8D, there is a graph illustrating the temporal profiles of the output light beam 116a when the beam splitter 102 had a 0.6 reflectivity and the output light beam 116b when the beam splitter 102 had a 0.1 reflectivity. The x-axis represents time (ns) and the y-axis represents output beam intensity.

Figure 8E:
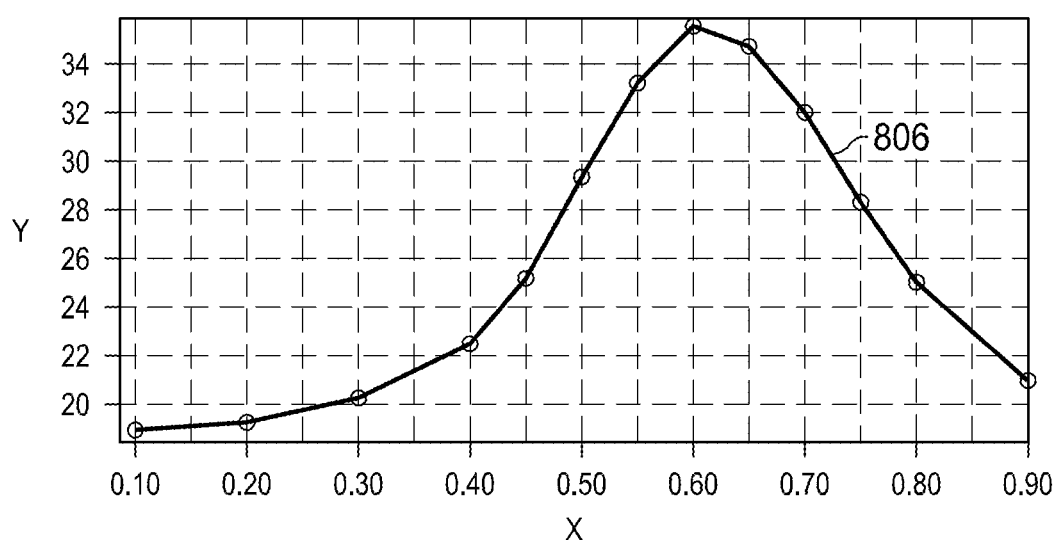

Referring to FIG. 8E, there is a graph illustrating the FWHM beam width 806 of the output beam 116 for the single delay line 104 as a function of the reflectivity of the beam splitter 102. The x-axis represents the reflectivity of the beam splitter 102 and the y-axis represents FWHM (ns).

Figure 9A:
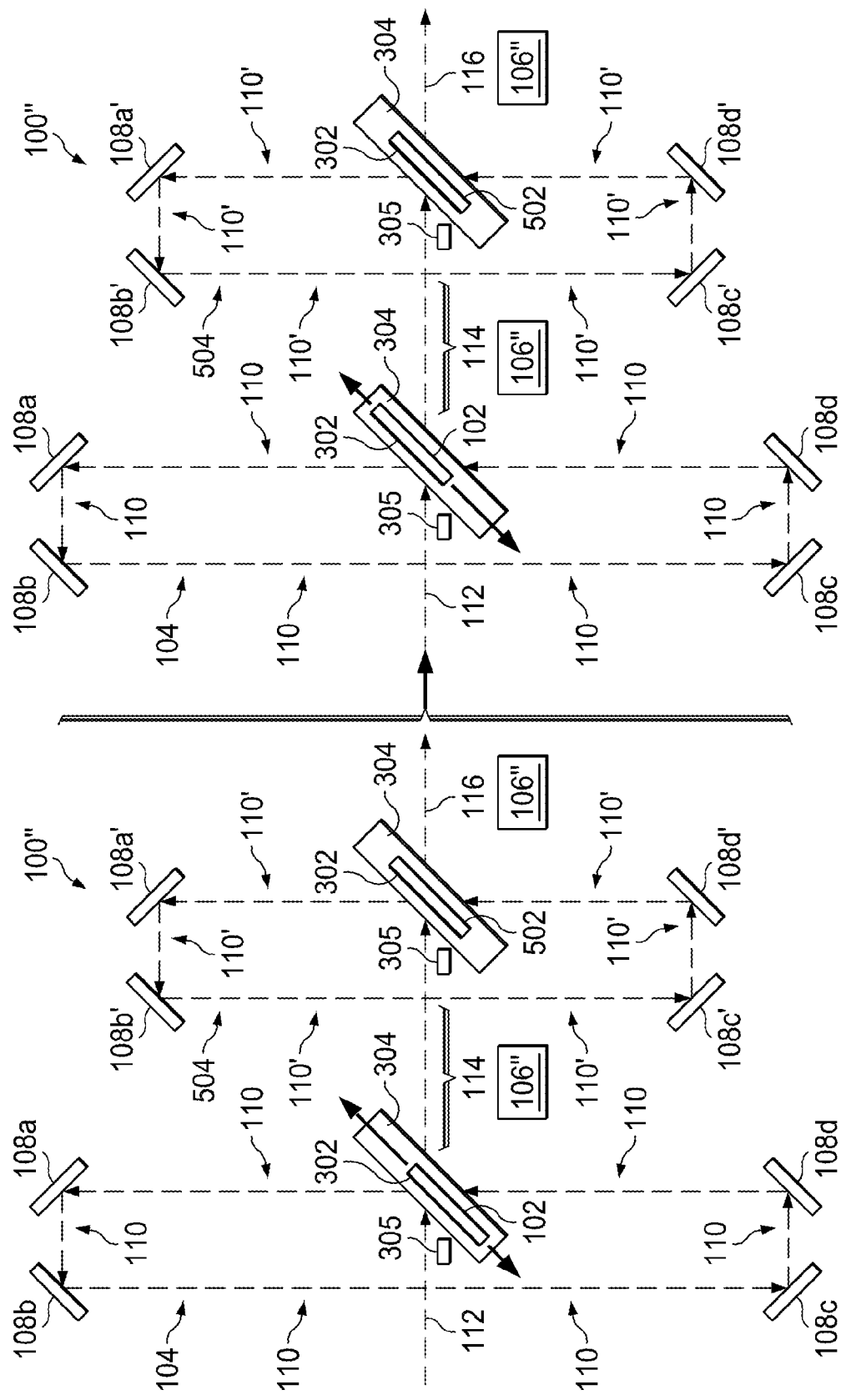
FIGS. 9A-9I are several diagrams, graphs and plots used to explain the features of an exemplary light pulse stretching unit which includes two beam splitters, two reconfiguration devices and two delay lines in accordance with an embodiment of the present invention.

Referring to FIGS. 9A-9I, there are illustrated several diagrams, graphs and plots used to explain the features of the exemplary light pulse stretching unit 100' which is configured to have a first beam splitter 102 (with a multi-reflective coating 302), a first delay line 104 (with four mirrors 108a, 108b, 108c and 108d positioned to create the delayed path 110 of 32 ns), a second beam splitter 502 (with a multi-reflective coating 302), a second delay line 504 (with four mirrors 108a', 108b', 108c' and 108d' positioned to create the delayed path 110' of 15 ns), and two reconfiguration devices 106" (each with slide 304 and actuator 305). As shown in FIG. 9A, the light pulse stretching unit 100' was configured where the first beam splitter 102 was positioned to have a 0.5 reflectivity (specific location on the multi-reflective coating 302) when received the input light beam 112 and then the first beam splitter 102 was moved to have a 0.2 reflectivity (another specific location on the multi-reflective coating 302) when received the input light beam 112 while the second beam splitter 502 was positioned to have a 0.5 reflectivity when received the light beam from the first beam splitter 102. It should be noted that the first beam splitter 102 with a 0.5 reflectivity means that 50% of light that is received is reflected onto the one delay line 104 while 50% of light that is received is passed to the output path 114. And, when first beam splitter 102 has a 0.2 reflectivity means that 20% of light that is received is reflected onto the one delay line 104 while 80% of light that is received is passed to the output path 114. The details of the temporal profile of the input light beam 112 and the temporal profiles of the resulting output beam 116 when the first beam splitter 102 had a 0.5 reflectivity and when the first beam splitter 102 had a 0.2 reflectivity while the second beam splitter 502 had a 0.5 reflectivity are described next.

Figure 9B:
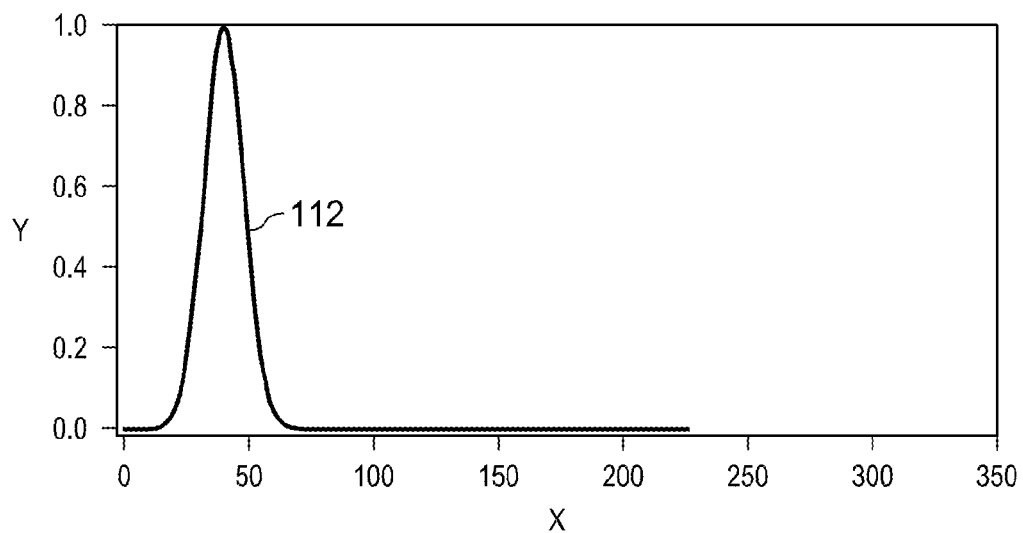

Referring to FIG. 9B, there is a graph illustrating the input light beam 112 which has a normal distribution and a mean=40 ns and a variance=64 $ns^2$ where the x-axis represents delay (ns) and the y-axis represents intensity.

Figure 9C:
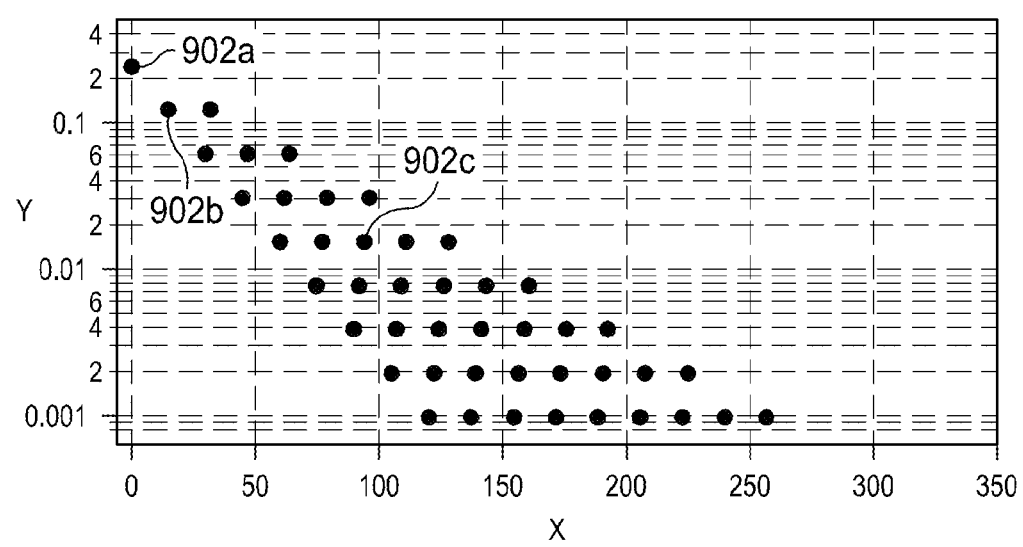

Referring to FIG. 9C, there is a graph illustrating the beamlet delay (ns) (x-axis) relative to beamlet transmission (y-axis) associated with the output beam 116 which is the summation of the beamlets 902a, 902b, 902c etc. . . . (only three labeled) when the two beam splitters 102 and 504 both had a 0.5 reflectivity and the delay lengths are 32 and 15 ns. The term beamlet here refers to a beam that is created every time an existing beam passes through the beam splitters 102 and 504. The first beamlet 902a represents the portion of the input light 112 that passed through the two beam splitters 102 and 502 without traversing the delayed paths 110 and 110'. The second beamlet 902b represents the portion of the input light 112 that passed through the two beam splitters 102 and 502 after one time of traversing the delayed path 110 one time. The third beamlet 902c represents the portion of the input light 112 that passed through the two beam splitters 102 and 502 after two times of traversing the delayed path 110 and two times traversing the delay path 110'. This is a total delay of 2×32+2×15=94 ns. The transmission of 902c is $0.5^6$=0.0156, since this beamlet will have been reflected by or transmitted through a beamsplitter six times in its path through the two delay lines. As discussed above, the two beam splitters 102 and 502 will continually direct a portion of the incident light beam 112 which traversed the respective delayed paths 110 and 110' back onto the respective delayed paths 110 and 110' and direct another portion of the incident light beam 112 onto the respective output paths 114 and each time this occurs less energy from the incident light beam 112 will be directed to the respective output paths 114 and the respective delayed paths 110 and 110'.

Figure 9D:
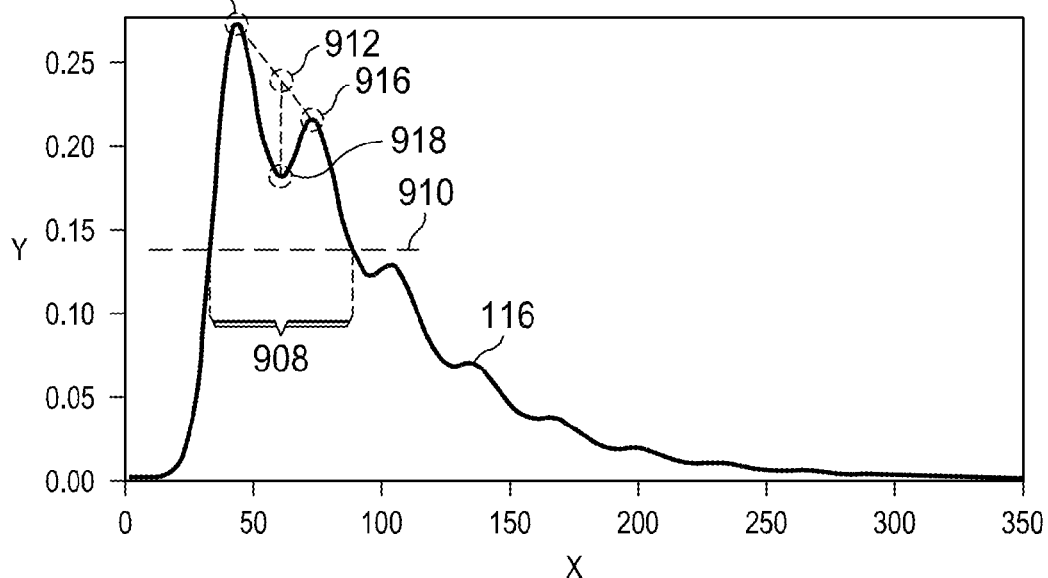
Figure 9E:
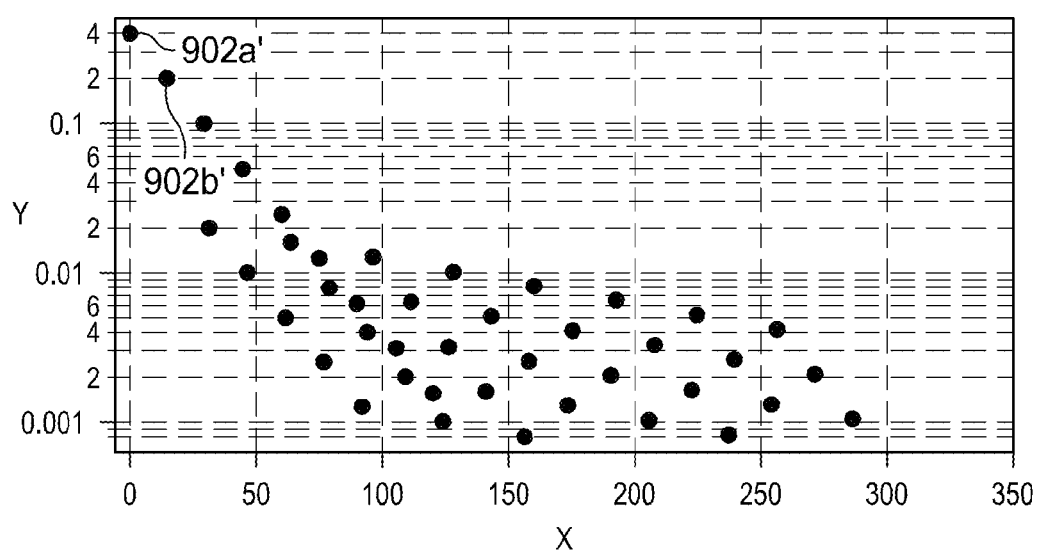

Referring to FIG. 9D, there is a graph illustrating the temporal profile of the output light beam 116 when the first beam splitter 102 and the second beam splitter 502 both had a 0.5 reflectivity. The x-axis represents time (ns) and the y-axis represents output beam intensity. As shown, the output light beam 116 had a 55.6 ns FWHM 908 (based on a half max line 910) and a smoothness of 0.24. The smoothness is defined by (Mi−Ni)/Mi where Mi 912 (Imax) is on a line between neighboring local maximums 914 and 916 (Ilocal1 and Ilocal2) at the same time as Mi 912 is above a local minimum 918 (Imin). The smoothness is calculated for all minimums over the output beam 116 and the maximum value is the "smoothness" of the output beam 116. The less the smoothness of the output beam 116 the more uniform the output beam 116 is over time which is a desirable feature in many applications.

a. Referring to FIG. 9E, there is a graph illustrating the beamlet delay (ns) (x-axis) relative to beamlet transmission (y-axis) associated with the output beam 116 which is the summation of the beamlets 902a', 902b', 902c' etc. . . . (only three labeled) when the first beam splitter 102 had a 0.2 reflectivity and the second beam splitter 502 had a 0.5 reflectivity. The first beamlet 902a' represents the portion of the input light 112 that passed through the two beam splitters 102 and 502 without traversing the delayed paths 110 and 110'. The second beamlet 902b' represents the portion of the input light 112 that passed through the two beam splitters 102 and 502 after one time of traversing the delayed paths 110 and 110'. As discussed above, the two beam splitters 102 and 502 will continually direct a portion of the incident light beam 112 which traversed the respective delayed paths 110 and 110' back onto the respective delayed paths 110 and 110' and another portion of the incident light beam 112 onto the respective output paths 114 and each time this occurs less energy from the incident light beam 112 will be directed to the respective output paths 114 and the respective delayed paths 110 and 110'.

Figure 9F:
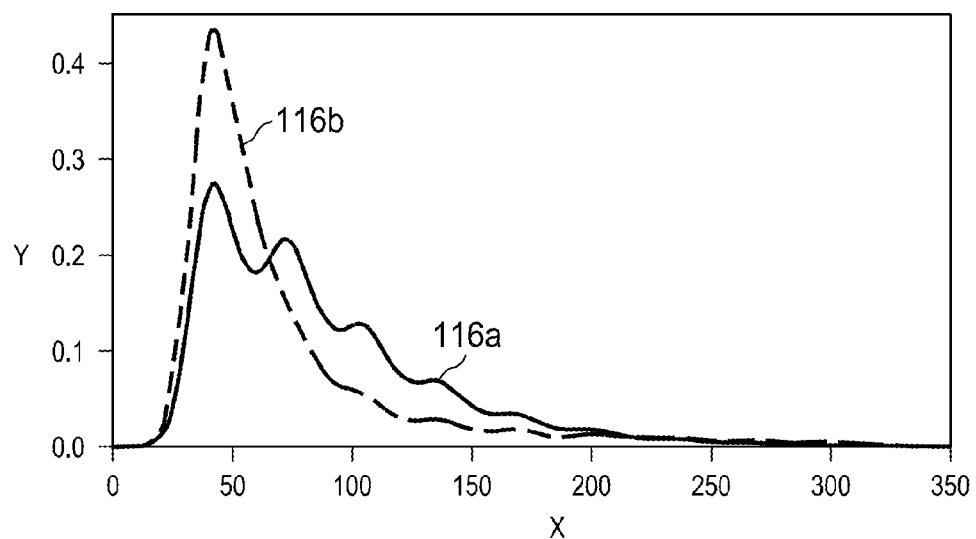

Referring to FIG. 9F, there is a graph illustrating the temporal profile of the output light beam 116a when the first beam splitter 102 and the second beam splitter 502 both had a 0.5 reflectivity and the temporal profile of the output light beam 116b when the first beam splitter 102 had a 0.2 reflectivity and the second beam splitter 502 had a 0.5 reflectivity. The x-axis represents time (ns) and the y-axis represents output beam intensity. In this case, the output light beam 116a had a 55.6 ns FWHM and a smoothness of 0.24 while the output light beam 116b had a 30.3 ns FWHM and a smoothness of 0.

Figure 9G:
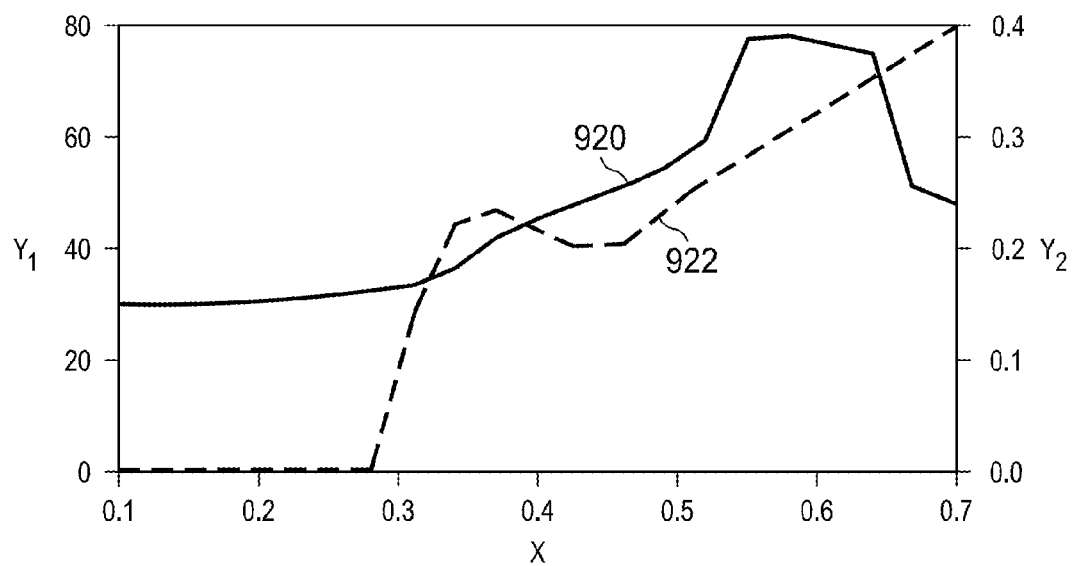

Referring to FIG. 9G, there is a graph illustrating the FWHM beam width 920 and smoothness 922 of the output beam 116 for the single delay lines 104 and 504 as a function of the reflectivity of the first beam splitter 102 while the second beam splitter 502 had a 0.5 reflectivity. The x-axis represents the reflectivity of the first beam splitter 102, the $y_1$-axis represents FWHM (ns), and the $y_2$-axis represents smoothness.

Figure 9H:
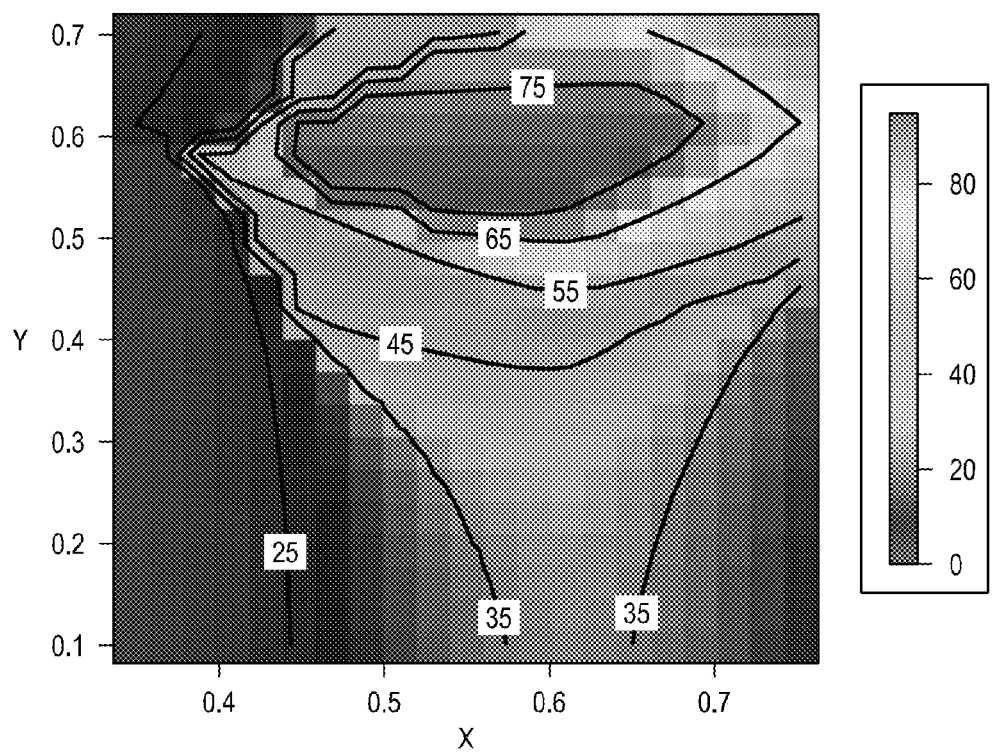

Referring to FIG. 9H, there is a graph illustrating the FWHM beam width (ns) of the output beam 116 for the two delay lines 104 and 504 as a function of different reflectivities of the first beam splitter 102 and the second beam splitter 502. The x-axis represents the reflectivity of the first beam splitter 102 and the y-axis represents the reflectivity of the second beam splitter 502.

Figure 9I:
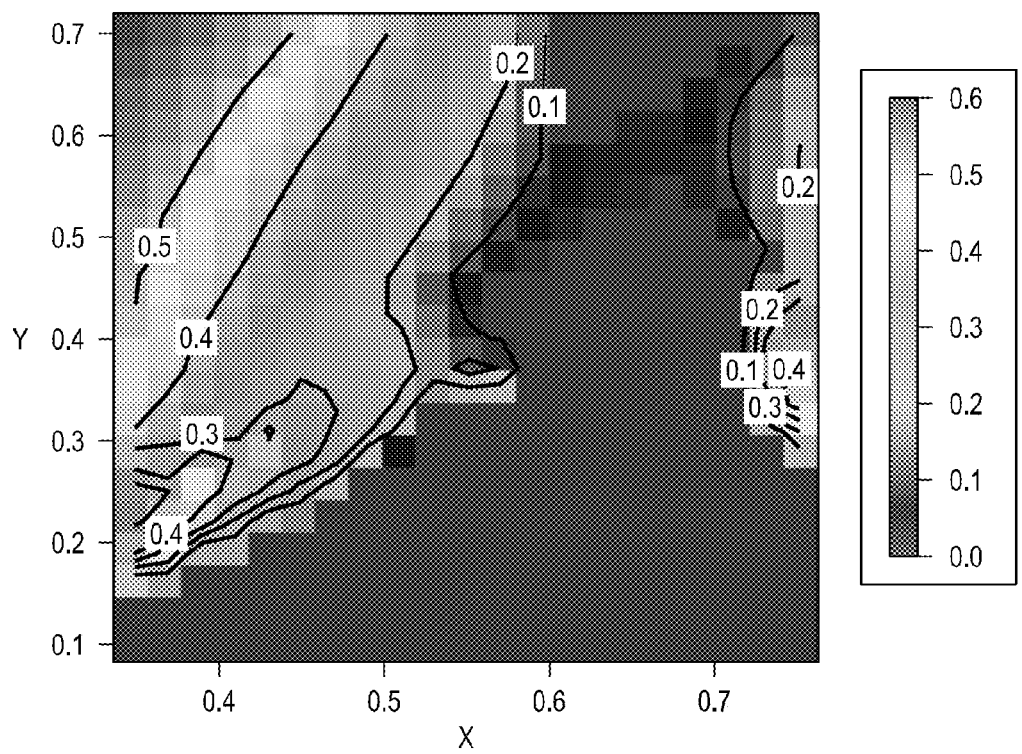

Referring to FIG. 9I, there is a graph illustrating the smoothness of the output beam 116 for the two delay lines 104 and 504 as a function of different reflectivities of the first beam splitter 102 and the second beam splitter 502. The x-axis represents the reflectivity of the first beam splitter 102 and the y-axis represents the reflectivity of the second beam splitter 502.

In view of the foregoing, one will appreciate with the teachings herein that the laser pulse stretching unit of the present invention has one or more delay lines which take a single input beam and create multiple beams delayed to generate the final output beam which is the summation of all the beams. In one example, the laser pulse stretching unit has multiple delay lines which are placed in serial to have more "stretching" on the beam while maintaining uniformity of the beam intensity versus time. The uniformity of the beam over time is also described as smoothness in the beam. As described above, a feature of the present invention is to adjust the output beam length by changing the reflectivity of the one or more beam splitters of one or more of the delay lines. In this way, the delay time(s) of one or more delay lines can be optimized to allow the greatest range of beam temporal width by changing only the reflectivities of the beam splitter(s) while still maintaining an acceptable level of smoothness of the final output beam. The reflectivity of any one of the beam splitters can be changed by replacing the beam splitter with another beam splitter which has a different split of reflectivity (reflectance) and transmission. Preferably, the reflectivity (reflectance)+transmittance of a beam splitter=1. Alternatively, the reflectivity of the beam splitter could be changed by sliding the beam splitter which has a variable reflective coating to allow a continuous change in the beam splitter. Or, the beam splitter could have a coating with discrete changes in transmission. Having the beam splitter change while on a slide or wheel would allow the beam width to change quickly with minimal to no alignment of the delay line(s).

The optimum beam length or temporal profile of the output beam can be found by experimentation with different length pulses. An advantage of the present invention is that the replacing or sliding of beam splitters is quick and relatively inexpensive when compared to having to adjust the length of the delay lines. The delay lines may have refocusing optics that keep the beam from diverging when traveling around the loop of the delay lines. Alternatively, the delay lines like the ones shown herein do not have refocusing optics in them but have mirrors with a set power that form an image of the beam at the beam splitter back onto the beam splitter over the loop. This keeps the beam from increasing in size from divergence for multiple loops. In any case, by changing the reflectivity of the beam splitter to adjust the temporal profile of the output beam can result in a system that does not need realignment, or only a minor tip or tilt adjustment of the beam splitter to have the system totally realigned. If a single beam splitter with multiple reflectivities and a slide (or wheel) is used, then the pulse beam length could be adjusted by actuators and with no alignment needed. This would allow an active adjustment during the use of the system based on possible feedback by some metrology in the system.

As described herein, the beam splitter reflectivity can be changed by manually changing the beam splitter. Plus, the beam splitter can be on a slide (or wheel) and include multiple pieces of glass or a single piece of glass with discrete changes in the reflectivity. The beam splitter can be a dielectric beam splitter which has a very low to no absorption. The reflectivity is described herein as changing, but the transmission also changes, so that reflectivity+transmission=~1. This is an assumption that was used in the calculations herein. Furthermore, a single beam splitter (glass piece) on a slide or wheel has the advantage of not having to be realigned when changed. A continuous reflectivity changing beam splitter would allow a continuous change in the output beam width as opposed to a discrete number of changes. The advantage of the slide (or wheel) is that it would allow a feedback unit to alter the beam length continuously or in many discrete lengths. In addition, the feedback unit could allow optimization of the process as a function of the parameters of the process, or as a response to metrology measuring the performance of the process. As an example in the crystallization process, a metrology instrument could measure some parameter such as scatter profile and use these results to alter the beam length to improve the scatter profile to a more desired one. Another example is an ablation process, where the shape or rate of the holes produced could be a function of the beam length, and measurements of the holes would provide feedback which is then used to adjust the beam length. This feedback could be continuous, if the metrology is included in the instruments process, or done as a setup adjustment for a run of parts to be processed.

Although several embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims.

The invention claimed is:

1. A light pulse stretching unit comprising:
a first beam splitter;
a first delay line;
the first beam splitter configured to receive an input light beam and direct a portion of the input light beam along an output path and to direct a remaining portion of the input light beam onto a first delayed path created by the first delay line;
the first beam splitter is configured to receive the remaining portion of the input light beam that traversed the first delayed path and direct a portion of the input light beam that traversed the first delayed path onto the output path and direct a remaining portion of the input light beam that traversed the first delayed path back onto the first delayed path;

the first beam splitter is configured to continually direct a portion of the remaining portion of the input light beam which traversed the first delayed path back onto the first delayed path and a remaining portion of the remaining portion of the input light beam which traversed the first delayed path onto the output path, where the remaining portions of the input light beam that are on the output path collectively form an output beam which has a specific temporal profile; and a reconfiguration device configured to interact with the first beam splitter to change the specific temporal profile of the output beam by repositioning the first beam splitter which has a multi-reflective coating thereon such that the first beam splitter which had a first reflectivity when originally positioned to receive the input light beam would have a second reflectivity after being repositioned to receive the input light beam.

2. The light pulse stretching unit of claim 1, wherein the specific temporal profile of the output beam comprises a specific Full Width at Half Maximum (FWHM) and a specific smoothness of the output beam.

3. A light pulse stretching unit comprising:
a first beam splitter;
a first delay line;
the first beam splitter configured to receive an input light beam and direct a portion of the input light beam along an output path and to direct a remaining portion of the input light beam onto a first delayed path created by the first delay line;
the first beam splitter is configured to receive the remaining portion of the input light beam that traversed the first delayed path and direct a portion of the input light beam that traversed the first delayed path onto the output path and direct a remaining portion of the input light beam that traversed the first delayed path back onto the first delayed path;
the first beam splitter is configured to continually direct a portion of the remaining portion of the input light beam which traversed the first delayed path back onto the first delayed path and a remaining portion of the remaining portion of the input light beam which traversed the first delayed path onto the output path, where the remaining portions of the input light beam that are on the output path collectively form an output beam which has a specific temporal profile; and
a reconfiguration device that is configured to change the specific temporal profile of the output beam by replacing the first beam splitter which has a first reflectivity with another beam splitter which has another reflectivity.

4. The light pulse stretching unit of claim 1, wherein the multi-reflective coating is either a variable reflective coating with a continuous change of reflectivities or a discrete reflective coating with separate discrete reflectivities.

5. The light pulse stretching unit of claim 1, wherein the reconfiguration device comprises a slide on which the first beam splitter is positioned and an actuator that moves the slide and the first beam splitter from one position to another position to change the specific temporal profile of the output beam.

6. The light pulse stretching unit of claim 1, wherein the reconfiguration device comprises a wheel on which the first beam splitter is positioned and an actuator that moves the wheel and the first beam splitter from one position to another position to change the specific temporal profile of the output beam.

7. The light pulse stretching unit of claim 1, further comprising a feedback unit that monitors an effect the output beam has on a work product and if needed based on the monitored effect instructs the reconfiguration device what needs to be done to the first beam splitter to change the specific temporal profile of the output beam.

8. The light pulse stretching unit of claim 1, further comprising a feedback unit that based on parameters of a process in which the output beam is to be used to interface with a work product instructs the reconfiguration device what needs to be done to the first beam splitter to change the specific temporal profile of the output beam.

9. The light pulse stretching unit of claim 1, further comprising:
one or more additional delay lines with one or more additional beam splitters which are positioned in series with each other and the first beam splitter and the first delay line; and
the reconfiguration device is configured to interact with any one or combination of the first beam splitter and the one or more additional beam splitters to change the specific temporal profile of a final output beam.

10. A method for using a light pulse stretching unit comprising the steps of:
receiving an input light beam at the laser light pulse stretching unit which comprises:
a first beam splitter;
a first delay line;
the first beam splitter configured to receive an input light beam and direct a portion of the input light beam along an output path and to direct a remaining portion of the input light beam onto a first delayed path created by the first delay line;
the first beam splitter is configured to receive the remaining portion of the input light beam that traversed the first delayed path and direct a portion of the input light beam that traversed the first delayed path onto the output path and direct a remaining portion of the input light beam that traversed the first delayed path back onto the first delayed path;
the first beam splitter is configured to continually direct a portion of the remaining portion of the input light beam which traversed the first delayed path back onto the first delayed path and a remaining portion of the remaining portion of the input light beam which traversed the first delayed path onto the output path, where the remaining portions of the input light beam that are on the output path collectively form an output beam which has a specific temporal profile; and
interacting with the first beam splitter to change the specific temporal profile of the output beam without adjusting a length of the first delayed path created by the first delay line, wherein the interacting step further comprises repositioning the first beam splitter which has a multi-reflective coating thereon such that the first beam splitter which had a first reflectivity when originally positioned to receive the input light beam would have a second reflectivity after being repositioned to receive the input light beam.

11. The method of claim 10, wherein the specific temporal profile of the output beam comprises a specific Full Width at Half Maximum (FWHM) and a specific smoothness of the output beam.

12. A method for using a light pulse stretching unit comprising the steps of:
   receiving an input light beam at the laser light pulse stretching unit which comprises:
   a first beam splitter;
   a first delay line;
   the first beam splitter configured to receive an input light beam and direct a portion of the input light beam along an output path and to direct a remaining portion of the input light beam onto a first delayed path created by the first delay line;
   the first beam splitter is configured to receive the remaining portion of the input light beam that traversed the first delayed path and direct a portion of the input light beam that traversed the first delayed path onto the output path and direct a remaining portion of the input light beam that traversed the first delayed path back onto the first delayed path;
   the first beam splitter is configured to continually direct a portion of the remaining portion of the input light beam which traversed the first delayed path back onto the first delayed path and a remaining portion of the remaining portion of the input light beam which traversed the first delayed path onto the output path, where the remaining portions of the input light beam that are on the output path collectively form an output beam which has a specific temporal profile; and
   interacting with the first beam splitter to change the specific temporal profile of the output beam without adjusting a length of the first delayed path created by the first delay line, wherein the interacting step further comprises replacing the first beam splitter which has a first reflectivity with another beam splitter which has another reflectivity.

13. The method of claim 10, wherein the multi-reflective coating is either a variable reflective coating with a continuous change of reflectivities or a discrete reflective coating with separate discrete reflectivities.

14. The method of claim 10, further comprising a feedback step including monitoring an effect the output beam has on a work product and if needed based on the monitored effect instructing the reconfiguration device what needs to be done to the first beam splitter to change the specific temporal profile of the output beam.

15. The method of claim 10, further comprising a feedback step that based on parameters of a process in which the output beam is to be used to interface with a work product instructing the reconfiguration device what needs to be done to the first beam splitter to change the specific temporal profile of the output beam.

16. The method of claim 10, wherein:
   the light pulse stretching unit further comprises one or more additional delay lines with one or more additional beam splitters which are positioned in series with each other and the first beam splitter and the first delay line; and
   the interacting step further comprises interacting with any one or combination of the first beam splitter and the one or more additional beam splitters to change the specific temporal profile of a final output beam without adjusting the first delayed line and the one or more additional delay lines.

17. The method of claim 10, wherein the interacting step further comprises utilizing a slide on which the first beam splitter is positioned and an actuator that moves the slide and the first beam splitter from one position to another position to change the specific temporal profile of the output beam.

18. The method of claim 10, wherein the interacting step further comprises utilizing a wheel on which the first beam splitter is positioned and an actuator that moves the wheel and the first beam splitter from one position to another position to change the specific temporal profile of the output beam.

* * * * *